Nov. 28, 1933.  A. W. GELPCKE  1,936,624
LOCKING CAP FOR FASTENERS
Filed Oct. 13, 1931
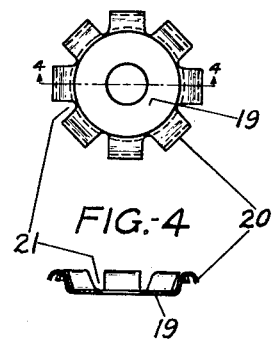
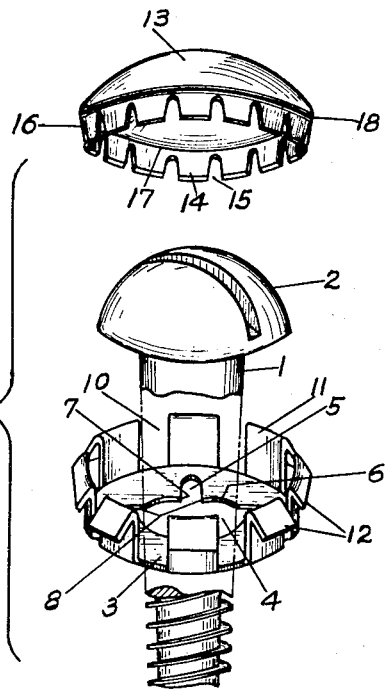
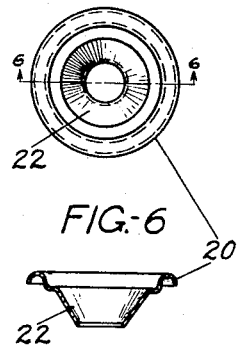
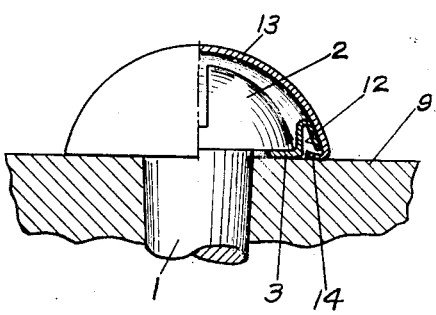
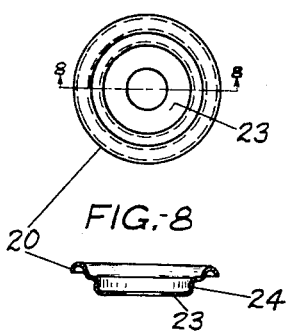
INVENTOR
ALFRED W. GELPCKE
BY HIS ATTORNEY Patented Nov. 28, 1933

1,936,624

UNITED STATES PATENT OFFICE 1,936,624

LOCKING CAP FOR FASTENERS

Alfred W. Gelpcke, Brooklyn, N. Y., assignor to The Rawlplug Company, Inc., New York, N. Y.

Application October 13, 1931. Serial No. 568,544

3 Claims. (Cl. 85—55)

This invention relates to cover caps used in connection with fasteners such as screws, bolts, and the like, and has for its object the provision of a cover cap which is both protective and ornamental.

In Berge Patent 1,805,937, issued May 19, 1931, there is shown and described a design of cover cap in association with a special locking or anchor means for holding the cap in position over the screw or bolt-head, or the like, as well as means for preventing the bolt or screw, as well as the cap, from turning.

My present invention is directed not only to an improvement in the method of holding the cap to the particular anchor means of said patent, but to other means whereby the cap is positively and absolutely held so that it will not shake or jar off the fastener and cannot be removed without entirely destroying the cap itself. The advantages of using a cover cap are well set forth in the said Berge patent and need not be repeated herein.

For the purpose of illustration, I have illustrated my improvement in the accompanying drawing wherein:

Figure 1 is a perspective view of my improvement with the parts in separated position.

Figure 2 is a part-elevational and part-sectional view showing the parts in fully assembled or operative position.

Figure 3 shows a plan view of another form of washer used to hold the cap in position over the fastener head.

Figure 4 is a section on line 4—4 of Figure 3.

Figure 5 is a plan view of still another form of washer.

Figure 6 is a section on line 6—6 of Figure 5.

Figure 7 shows a still further modified form of washer.

Figure 8 is a section on the line 8—8 of Figure 7.

In the drawing, a screw 1 having a head 2 is illustrated in association with an anchor member in the form of a cup-shaped member or washer 3. The washer 3 is provided with a screw or bolt opening 4, and radiating from this opening, are a plurality of slots 5 which divide the bottom part of the washer 3 into tongue members 6. The inner ends of these tongue members 6 are twisted out of the normal flat plane of the bottom of the washer in such a manner as to allow the screw 1 to be rotated clockwise, but to resist an anti-clockwise rotation of the screw by the upper corner 7 of the tongues 6 biting into the upper part of the screw-head 2, and the lower corner 8 of the tongues 6 biting into the support member 9 against which the screw-head 2 is set. The twist on the tongues 6 is determined with reference to the direction of rotation which it is desired to prevent, and these tongues 6 may be set to resist clock-wise rotation; or certain tongues may be twisted one way and others the other way to prevent rotation in both directions when nails or rivets comprise the fasteners.

The rim of the lock washer anchor is formed with slots 10 therein which divide the rim of the washer into anchoring spring fingers 11 having outwardly and downwardly extending ends 12. This anchoring member 3 is preferably constructed of steel so that it is hard and more or less springy. The anchor member just described is substantially the same as that shown in said Berge patent, but it has been described as above in order to make the application of my improvement clear.

While I may use this style of locking member, there are other ways of applying my invention. For example, in Figures 3 and 4 there is shown a washer 19 without the screw-locking feature of the washer 3, but having a downwardly turned flanged rim 20 which may be continuous, as in the form of washer shown in Figures 5 and 6; or the rim may have portions 21 removed. The washer used may take the form shown in Figures 5 and 6, wherein the washer 22 is of the countersunk type with a solid flange 20. In Figures 7 and 8, the washer 23 is cup-shaped with a shoulder 24 pressed into the periphery, this shoulder to rest on or engage the surrounding surface of the hole through which it is inserted. Still other forms of washers may be used, but in each case they are provided with the flange 20 or equivalent means for co-operation with the cap as will now be explained.

Referring back to Figures 1 and 2, when the screw-head 2 is tightened down on the work 9, the screw or bolt is securely locked into position against rotation and is ready to receive the cap 13. The cap 13, while shown as a plain cap, may be provided with ornamental designs of various kinds, but the rim portion is serrated or provided with a plurality of subdivisions 14 separated by slots 15. These subdivisions 14 are formed so that they project slightly inwardly toward the axis of the cap as is indicated at 16, in order to insure that the capping or crowning tool, somewhat like that shown in Figure 6 of the Berge patent, will force the serrations 14 under the anchoring portions 12 of the locking member 3, about as illustrated in Figure 2. The serrations 14 need not necessarily be the same width as the locking fingers 12, and it is preferable that they are not, so that at least one of the serrations will pass into some one slot 10 thereby absolutely preventing the cap 13 from turning on the member 3.

In order to further insure the turning inwardly of the serrations 14 when force is applied to the crowning tool to force the cap into position, the inside of the cap may be provided with a circular groove along the line 17 located immediately above the serrations 14; or an annular shoulder indicated by the line 18, may be provided above the serrated edge of the cap. Still another way may be used, by thinning out the metal of the subdivisions 14 so that the thickness of the metal tapers toward the bottom of the serrations. I do not wish to be limited exactly to any one method of accomplishing the bending of these serrated portions inwardly in order that they will lock under the members 12, or the equivalent thereof, as the means used may be varied according to the size of the cap or the particular design in which it is made. The action of the cap is substantially the same when used with either style of washer shown.

Furthermore, the serrations 14 when forced under the rim of the washers of either design, will cut into the under surface of the flange 20 sufficiently to prevent rotation of the cap on the washer, and also act to hold the washer in place, since the serrations 14 are in forced engagement with the support member 9.

One purpose of washers like those shown in Figures 5 to 8 inclusive, is so the head of the screw or other type of fastener will be flush or below the surrounding material into which it goes. In the use of standard countersunk washers under the head of the fastener, which construction is commonly used on sheet metal assemblies, the countersunk washer leaves a depression which fills up with dirt, and dust, but the use of my special washer permits a cap to be used, as has been described.

Caps applied to fasteners in the manner shown and described, will not jar or rattle off the fastener; in fact, they cannot be removed without destruction of the cap.

Having thus described my invention, what I claim is:

1. Means for covering the head of a fastener after the same has been forced into fastening position comprising; a washer to receive the head of the fastener, said washer having a downwardly turned flanged rim, and a cover cap having a serrated edge adapted to be passed over and to enclose both the head of the fastener and the washer after the fastener has been forced to fastening position, said cap being provided with means for insuring that said serrations will have their ends turned completely under said flanged rim of the washer which remains substantially unchanged when the cap is forced over the fastener head and washer to positively lock the cap in place.

2. Means for covering the head of a fastener after the same has been forced into fastening position comprising; a washer to receive the head of the fastener, said washer having bent-over rim portions which remain substantially unchanged in general shape when a cover cap is applied thereover, and a cover cap adapted to telescope over said head and bent-over portions of the washer after the fastener has been forced to fastening position, said cap having a formation above the rim portions to insure that said portions turn under said bent-over portions when the cap is forced into operative position as described.

3. Means for covering the head of a fastener, having a flat bottom face, after the same has been forced into fastening position including; a cover cap applied to the head of the fastener by a crowning tool, said cap having a serrated rim with a formation adjacent the rim to insure that the serrations will turn toward the axis of the fastener when force is applied by the crowning tool, and unchanging means having a portion extending from the bottom face of the head of the fastener and being engaged by said serrations as they are turned toward the axis of the fastener by the crowning tool.

ALFRED W. GELPCKE.